Sept. 29, 1925.  
R. E. BECHTOLD  
FLUID FLOW INDICATOR  
Filed Nov. 5, 1920  
2 Sheets-Sheet 2

Patented Sept. 29, 1925.

1,555,178

UNITED STATES PATENT OFFICE.

REUBEN E. BECHTOLD, OF FORT WAYNE, INDIANA, ASSIGNOR TO S. F. BOWSER & COMPANY, INC., OF FORT WAYNE, INDIANA, A CORPORATION OF INDIANA.

FLUID-FLOW INDICATOR.

Application filed November 5, 1920. Serial No. 421,865.

*To all whom it may concern:*

Be it known that I, REUBEN E. BECHTOLD, a citizen of the United States, residing at Fort Wayne, in the county of Allen and State of Indiana, have invented certain new and useful Improvements in Fluid-Flow Indicators, of which the following is a specification.

My invention relates to self-measuring pump apparatus, particularly of the plunger type wherein the accuracy of measuring liquids depends largely upon the condition of the valves and plunger. If the plunger does not fit closely in the cylinder or if certain valves do not close properly the pump mechanism might be operated without discharging the proper amount of liquid. There may also be other conditions under which the pump might have to be operated several strokes before any liquid is discharged.

One of the objects of my invention is the provision of simple and efficient means for indicating the flow of fluids, such as gasoline or other liquids or gases through the discharge pipe, particularly in self-measuring apparatus, so that the discharge of liquid all the time that the pump apparatus is operated will be visible to the customer.

Another object of my invention is the provision of means for mounting a liquid flow indicator in a discharge pipe so that such indicator will be relieved of bending strains exerted on the pipe.

Other objects will appear hereinafter, the novel combinations and features of the invention being set forth in the appended claims.

An embodiment of my invention is illustrated in the accompanying drawings, forming a part of this specification, and in which—

Figure 1:
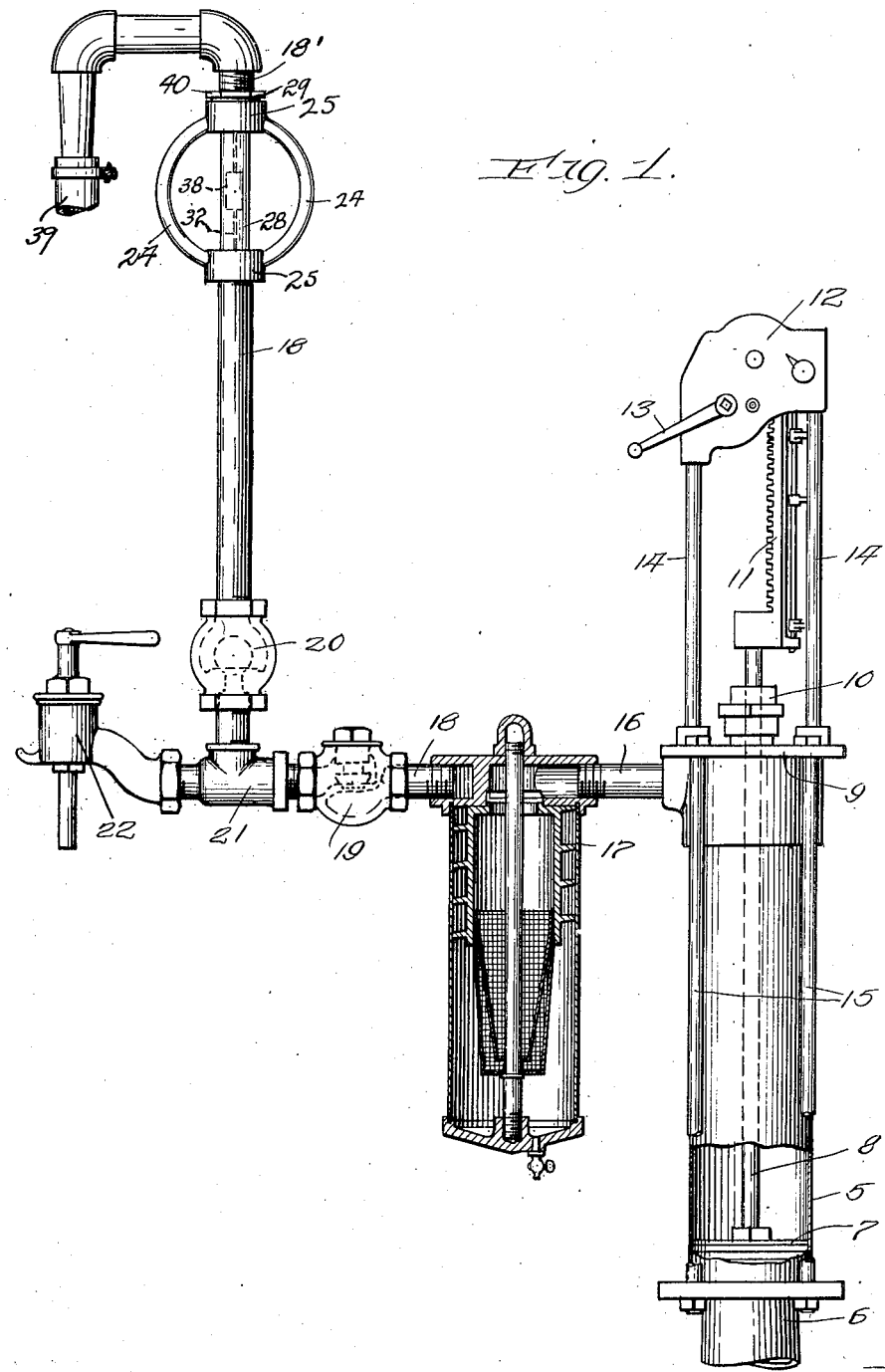
Fig. 1 is a side elevation with parts broken away to show underlying portions of a dispensing apparatus for gasoline, and the like, embodying my invention.

Referring more particular to the drawings, I have indicated a pump cylinder 5 attached to a base 6. The base 6 is connected in any desirable manner with a supply of gasoline or other fluid, which is not shown. In the cylinder 5 is a piston 7 having a piston rod 8 extending up through the top of the upper head 9 of the cylinder through a stuffing box 10 and connected with a rack bar 11 which engages operating mechanism in a head 12 and operated by a manually operable crank 13 mounted on the head 12. The head 12 is connected by means of rods or other frame 14 with the upper head 9 of the cylinder and the latter is connected to the base 6 by rods or other means 15.

At the top of the cylinder 5 is a discharge pipe 16 which in the present instance is disposed substantially horizontal and is connected to the casing of a filtering apparatus 17. The discharge opening of the filter apparatus 17 is connected by means of a pipe 18 with the lower end of the frame of my improved fluid flow indicator. In the pipe 18 I have indicated a horizontal check valve 19 and a vertical check valve 20, both of ordinary design. Also, in the pipe 18 is indicated at T 21 and connected in one end of the T is a dispensing valve 22. The check valves 19 and 20, the T 21, and the dispensing valve 22 may all be of any approved construction. Also the self-measuring pump and filtering mechanism may be of any ordinary or approved construction.

My improved liquid flow indicator is illustrated in Fig. 1 in the vertical portion of the discharge pipe of the measuring pump. While I have shown the indicator between the pipe sections 18 and 18', it should be understood that it is capable of being connected at any point along the vertical discharge pipe, including the upper end thereof.

Figure 2:
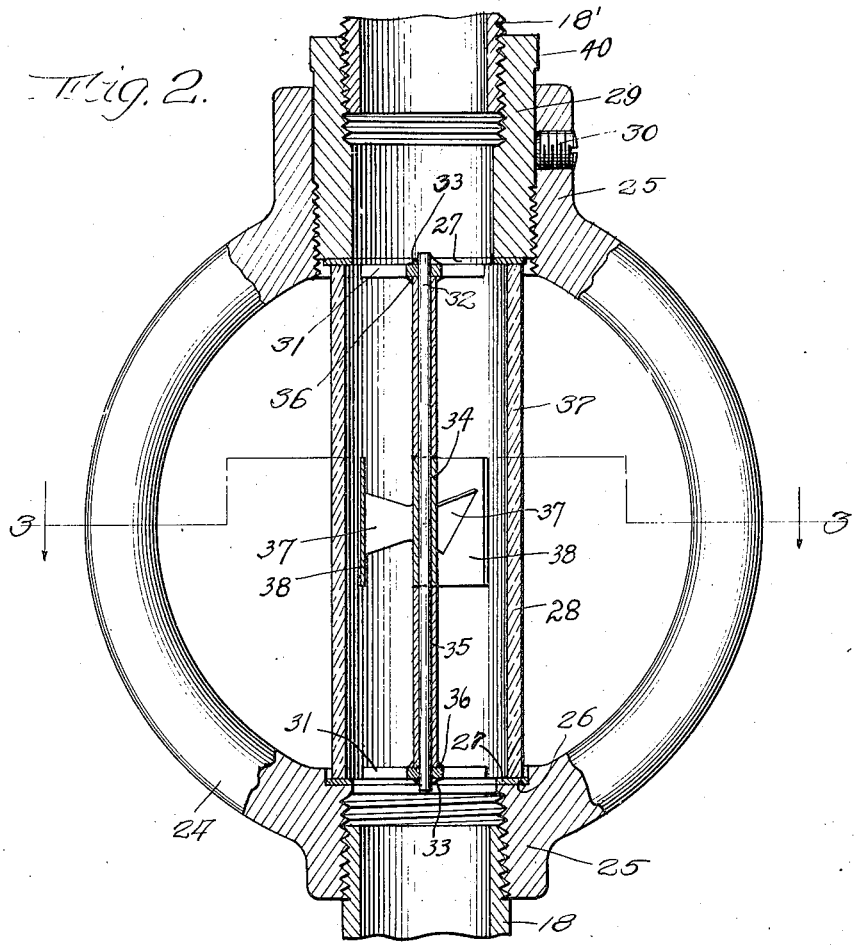
Fig. 2 is an enlarged section of the flow indicating means.

In the present instance I have illustrated my improved indicator as comprising an annular supporting bracket or open annular frame having arcuate webs 24 connecting the spaced-apart collars 25 having alined openings therethrough. The supporting bracket is screw-threaded onto the upper end of the discharge pipe 18 leading upwardly from the pump apparatus. The lower collar 25 is provided with an annular shoulder or seat 26 to receive the annular gasket 27, and on the latter is adapted to rest the transparent tube 28, as shown in Fig. 2. The tube 28 extends upwardly across the annular frame so as to be exposed to view.

The upper end of the supporting bracket is formed to receive the threaded bushing 29. The latter is also screw-threaded at its inner upper end portion to receive the upper pipe section 18′, as shown in Fig. 2. The bushing or tubular member 29 may be turned by applying a tool at 40 and since the lower end of the bushing is screw-threaded to the upper collar 25 and is also screw-threaded to the lower end of the upper pipe section 18′, this bushing may be moved upwardly or downwardly to a limited extent independently of the supporting bracket and of the pipe 18′; that is to say, the tubular member 29 may be moved up or down while the pipe section 18′ and the supporting bracket remain stationary. It will thus be seen that the bushing or screw-threaded tubular member 29 may be used as a clamp to hold the transparent tube 28 securely in the frame, and the gaskets 27 at the ends of the tubular frame may be relied upon to obtain liquid-tight joints when the bushing is moved down to the position shown in Fig. 2.

The gaskets 27 not only assure tight joints but also distribute the pressure on the glass tube 28. After the tubular clamping member 29 has been screwed down tight it may be secured in adjusted position by means of a set screw 30. The latter is designed to hold the tubular clamping member 29 against retrograde movement to prevent loosening of the transparent tube 28.

In Fig. 2 I have indicated an upper pipe section 18′ screw-threaded to the tubular clamp 29, but it should be understood that when desired the upper liquid discharge pipe may form a direct continuation of the tubular clamp 29 so that the liquid will flow directly through the member 29 to any suitable means for dispensing the liquid. However, it should be particularly noted that the annular frame supports the upper pipe section 18′ or any pipe which is connected to the clamping member 29. The annular frame rigidly connects the upper and lower pipe sections 18 and 18′, as shown in Fig. 2. Therefore, when a flexible delivery hose, such as that indicated at 39 in Fig. 1, is connected to the upper section 18′ the bending strains will be taken by the supporting bracket or annular frame and thus protect the glass tube 28 by relieving the strain thereon. In other words, the glass tube 28 may be held in position between flexible gaskets on the annular seats, while the bending strains due to movement of the hose 39 are resisted by the annular frame 24 connected rigidly between the upper and lower pipe sections 18 and 18′ independently of the glass tube 28. It will also be seen that the tubular nut or clamping device 29 may serve to hold the glass tube 28 in place while at the same time affording a rigid connection between the annular frame 24 and the upper pipe section 18′. The rigid connection between the lower pipe section and the upper pipe section 18′ is therefore maintained whether the glass tube 28 is in place, or not. Disposed within the glass tube 28 is a butterfly vane adapted to be operated by the flow of liquid through the tube to indicate such flow. At the ends of the glass tube 28 are located spiders 31 the legs of which are of sufficient length to form an easy fit in the bore of the glass tube. A shaft rod 32 is secured rigidly at 33, 33 to the centers of the spiders 31 so as to space them apart a sufficient distance to cause them to be located at the ends of the glass tube but so that no pressure will be exerted thereon when the tubular clamp 29 is screwed down tight onto the glass tube. It should be noted that the gaskets 27, 27 extend inwardly a sufficient distance to overlap the outer ends of the spiders 31 so as to confine the latter to their proper positions at the ends of the glass tube 28.

Rotatably mounted on the shaft rod 32 is a cylindrical hub 34 located between the ends of the tubes 35 which are secured to the spiders 31 at 36, 36. The tubes 35 which are secured to the shaft 32 form shoulders to prevent the butterfly vane from moving up or down along the shaft 32. The latter is held centrally within the glass tube by being secured to the centers of the spiders 31.

Figure 3:
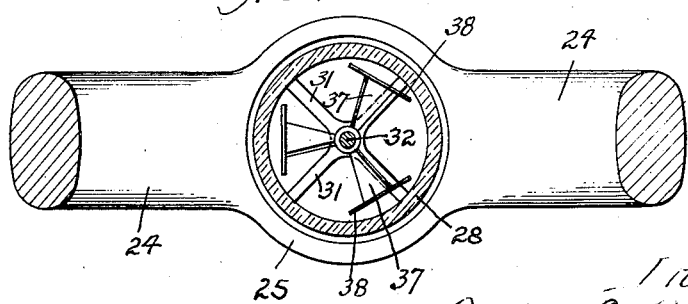
Fig. 3 is a section taken on line 3—3 of Fig. 2.

Extending radially from the hub 34 are a plurality of blades 37 arranged approximately spirally, as shown in Figs. 2 and 3. The blades or vanes 37 are set angularly, as shown, so that fluid flowing through the tube 28 would cause the hub 34 and the parts carried thereby to rotate on the shaft 32 intermediate the ends of the glass tube. At the outer ends of blades 37 I have shown vertical plane plates 38 substantially perpendicular to a radiating plane extending through the axis of rotation of the vane. By having the plates 38 travel edgewise upon rotation of the vane the resistance of movement through the fluid will be reduced. While the vertical plates may be omitted I prefer to include them for the sake of making the rotation of the vane more easily visible upon the flow of fluid through the glass tube 28. It should also be noted that when gasoline is used it is preferable to include the whirling vane in the glass tube since gasoline flowing through said tube is colorless.

When the indicating mechanism herein disclosed is connected in a discharge pipe of measuring pump apparatus, leaky valves will be indicated by the liquid settling below the sight glass 28. Furthermore, even when the sight glass is full of liquid and the butterfly vane does not spin while the pump is being operated it will be understood by the customer that no liquid is being discharged. Either the plunger 7, (Fig. 1) does not fit closely in the cylinder 5 or some other mechanism is out of order, but when the customer observes that the vane is rotating in the glass tube 28 he may be assured that the pump measuring apparatus is operating properly.

Obviously those skilled in the art may make various changes in the details and arrangements of parts without departing from the spirit and scope of my invention as defined by the claims hereto appended and I wish therefore not to be restricted to the precise construction herein disclosed.

What I claim and desire to secure by Letters Patent of the United States is:

1. In liquid flow indicating mechanism for liquid dispensing apparatus, the combination with a transparent tube, of spaced-apart spiders in said tube, a rod connecting said spiders, a vane rotatably mounted on said rod, and tubes on said rod for spacing said vane intermediate said spiders.

2. In liquid flow indicating mechanism for dispensing apparatus, the combination with a transparent tube, of spaced-apart spiders in said tube, a shaft rod rigidly connecting said spiders, a vane comprising a tube mounted on said rod, and additional tubes on said rod for spacing the vane intermediate the spiders.

3. In dispensing apparatus, the combination with a frame, of a transparent tube, spaced-apart spiders in said tube, a shaft connecting said spiders, a rotatable fluid flow indicator mounted on said shaft, spaced-apart gaskets at the ends of said tube overlapping the radial ends of said spiders, and means for clamping the gaskets against the ends of said tube to hold the latter in said frame and to confine said spiders within said tube.

In testimony whereof I have signed my name to this specification on this 29" day of October, A. D. 1920.

REUBEN E. BECHTOLD.